(12) United States Patent
Maréchal et al.

(10) Patent No.: US 11,093,232 B2
(45) Date of Patent: Aug. 17, 2021

(54) MICROSERVICE UPDATE SYSTEM

(71) Applicant: Dell Products L.P., Round Rock, TX (US)

(72) Inventors: Marc Marcel René Maréchal, Shanghai (CN); Yongjun Shi, Shanghai (CN)

(73) Assignee: Dell Products L.P., Round Rock, TX (US)

(*) Notice: Subject to any disclaimer, the term of this patent is extended or adjusted under 35 U.S.C. 154(b) by 57 days.

(21) Appl. No.: 16/503,146

(22) Filed: Jul. 3, 2019

(65) Prior Publication Data

US 2020/0348921 A1 Nov. 5, 2020

(30) Foreign Application Priority Data

Apr. 30, 2019 (CN) .......................... 201910361495.3

(51) Int. Cl.
  *G06F 9/44* (2018.01)
  *G06F 8/65* (2018.01)
  *G06F 11/36* (2006.01)
  *G06F 8/71* (2018.01)

(52) U.S. Cl.
  CPC ............ *G06F 8/65* (2013.01); *G06F 11/3688* (2013.01); *G06F 8/71* (2013.01)

(58) Field of Classification Search
  CPC ....................................................... G06F 8/65
  USPC ............................................................ 717/124
  See application file for complete search history.

(56) References Cited

U.S. PATENT DOCUMENTS

| | | | |
|---|---|---|---|
| 6,782,448 B2 | 8/2004 | Goodman et al. | |
| 10,389,602 B2* | 8/2019 | Chang | H04L 41/5045 |
| 10,620,854 B1* | 4/2020 | James | G06F 3/0619 |
| 2011/0283270 A1 | 11/2011 | Gass et al. | |
| 2012/0166876 A1* | 6/2012 | Zambrana | G06F 11/3612 714/32 |
| 2017/0242784 A1* | 8/2017 | Heorhiadi | G06F 11/3692 |
| 2018/0270125 A1* | 9/2018 | Jain | G06F 16/00 |

* cited by examiner

*Primary Examiner* — Evral E Bodden
(74) *Attorney, Agent, or Firm* — Haynes and Boone, LLP

(57) ABSTRACT

A microservice update system includes a build dispatcher system that receives a microservice modification request identifying first microservice(s) included in a plurality of microservices that provide a service. The build dispatcher system then triggers a respective microservice pipeline for each first microservice. A continuous integration system receives respective microservice modified code for each first microservice via the respective pipeline triggered for each, and update corresponding first portion(s) of service code. The continuous integration system then tests the updated service code in order to test the first microservice(s) that are provided by the first portion(s) of updated service code, and test second microservice(s) that are included in the plurality of microservices that provide the service, that are provided by at least one second portion of the updated service code that was not updated as part of the updating, and that are dependent on at least one of the first microservice(s).

20 Claims, 9 Drawing Sheets

MICROSERVICE UPDATE SYSTEM

CROSS REFERENCE TO RELATED APPLICATION

The present application claims priority to Chinese Patent Application Serial No. 201910361495.3 filed Apr. 30, 2019, entitled "MICROSERVICE UPDATE SYSTEM," the disclosure of which is incorporated herein by reference.

BACKGROUND

The present disclosure relates generally to information handling systems, and more particularly to updating microservices that enable a service provided by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, one or more network-connected server devices (sometimes referred to as "cloud servers"), are sometimes utilized to provide services to customer systems. Conventionally, such services have been provided via a "monolithic" application run by the network-connected server device(s), which one of skill in the art will recognize is a single-tiered software application in which the software application components (e.g., a user interface, data access code, etc.) are combined/integrated into a single program from a single platform that is self-contained and independent from other computing applications. As such, the monolithic application operates to perform every step/operation necessary to provide the desired functionality, and is designed without modularity. However, monolithic applications are being replaced with microservices, which one of skill in the art will recognize are provided according to a software development technique that structures the service provided by the network-connected server device(s) as a collection of loosely-coupled, fine-grained microservices operating via lightweight protocols, which provides for modularity that makes the service easier to understand, develop, and test, while also providing for resiliency to architecture erosion. Furthermore, the utilization of microservices enables autonomous teams to develop and scale their respective microservices independently, while allowing the architecture of any individual microservice to emerge through continuous refactoring and/or updating, enabling continuous integration, delivery, and deployment of the microservices that provide the service.

However, the conventional updating of services provided via the microservices discussed above suffers from a number of issues, as conventional service updating techniques are designed for the monolithic applications discussed above and, as such, provide for the updating of all the code in the code repository for a service when an update/build is triggered. While such service updating techniques makes sense for monolithic applications, they introduce a number of inefficiencies in the microservice-oriented architectures discussed above in which the microservices may be provided as discrete code modules. For example, when a developer makes a code change to their microservice, that code change will often only affect a subset of the microservices that provide the service (e.g., a single microservice and, in some cases, microservice(s) that are dependent on that microservice). However, the update/build that is triggered when that code change is submitted causes the rebuilding of the entire code repository for the service, thus rebuilding all of the microservices provided by that code repository, including many microservices that were not modified and that are not dependent on a modified microservice. As such, the conventional updating of services in response to the modification of one or more of their microservices is inefficient, with relatively long build times associated with the modification of individual microservices that consume relatively large amounts of resources that can prevent or limit the ability to perform parallel build operations.

Accordingly, it would be desirable to provide an improved microservice update system.

SUMMARY

According to one embodiment, an Information Handling System (IHS) includes a processing system; and a memory system that is coupled to the processing system and that includes instructions that, when executed by the processing system, cause the processing system to provide a continuous integration engine that is configured to: receive, for each of a first subset of microservices that are included in a plurality of microservices that are configured to provide a service and for which a modification has been requested, respective microservice modified code for each of the first subset of microservices; update, using the respective microservice modified code for each of the first subset of microservices, at least one first portion of service code that provides the first subset of microservices for the service, wherein the updating provides updated service code; and test the updated service code in order to test: the first subset of microservices that are provided by the at least one first portion of the updated service code; and a second subset of microservices that are included in the plurality of microservices that are configured to provide the service, that are provided by at least one second portion of the updated service code that was not updated as part of the updating, and that are dependent on at least one of the first subset of microservices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, Read-Only Memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
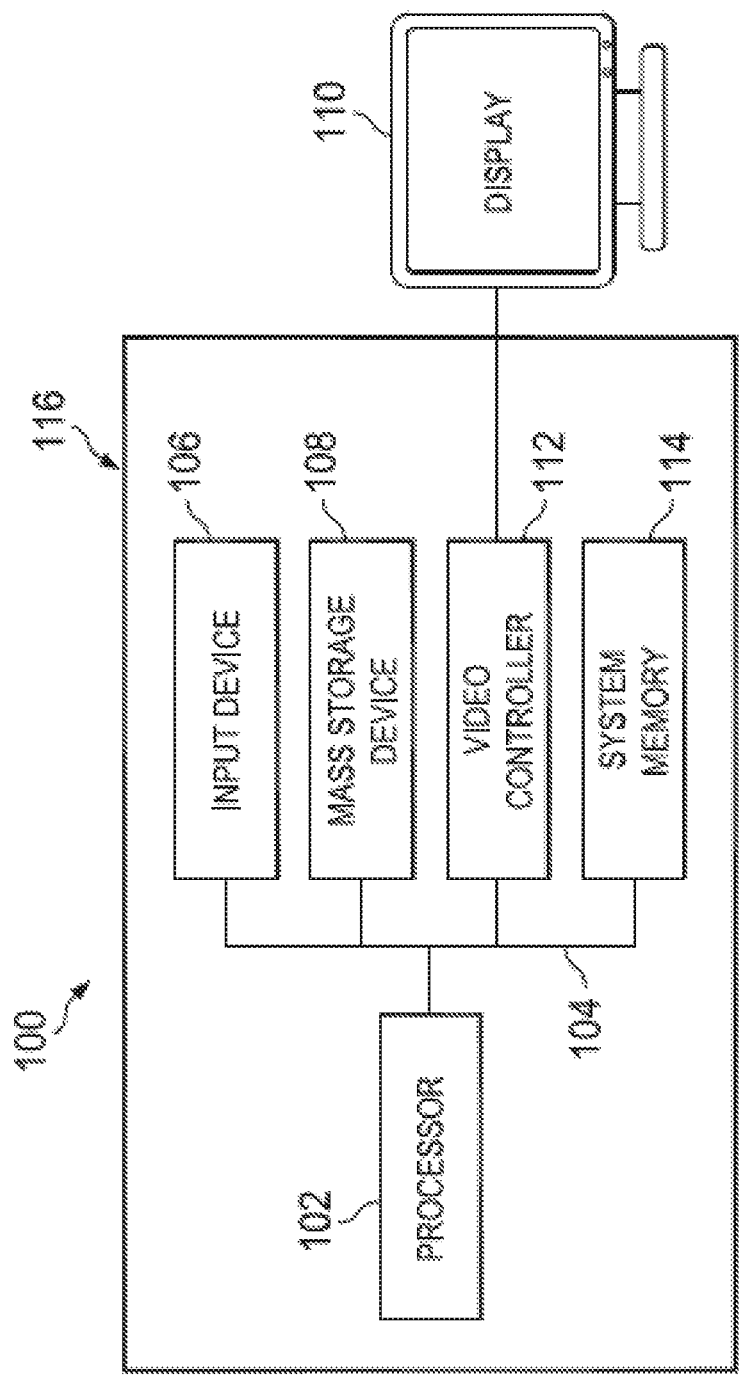
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
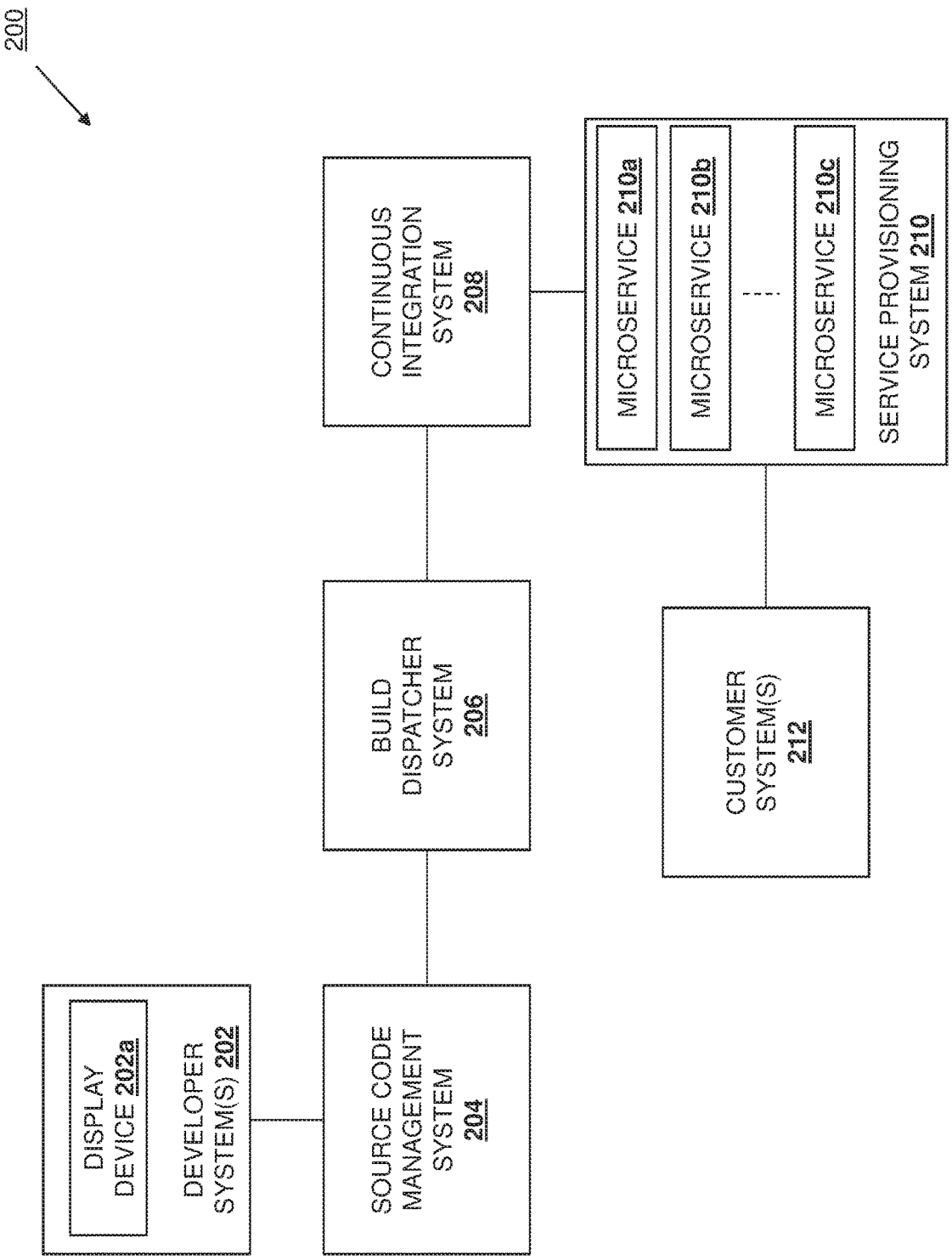
FIG. 2 is a schematic view illustrating an embodiment of microservice update system

Referring now to FIG. 2, an embodiment of a microservice update system 200 is illustrated. In the illustrated embodiment, the microservice update system 200 incudes one or more developer systems 202. In an embodiment, any or all of the developer system(s) 202 may be provided by the IHS 100 discussed above with reference to FIG. 1, and/or may include some or all of the components of the IHS 100. In specific examples, any or all of the developer system(s) 202 may be provided by desktop computing devices, laptop/notebook computing devices, tablet computing devices, and/or other user devices that one of skill in the art in possession of the present disclosure would recognize is configured to allow a developer to provision software code for providing the microservices and microservice modifications/update discussed below. In the illustrated embodiment, each of the developer system(s) 202 includes a display device 202a, although one of skill in the art in possession of the present disclosure will recognize that the developer system(s) 202 will include a variety of other computing components in order to provide the functionality discussed below as well.

The microservice update system 200 also incudes a source code management system 204 that is coupled to the developer system(s) 202 (e.g., via one or more networks provided by a Local Area Network (LAN), the Internet, etc.) In an embodiment, the source code management system 204 may be provided by the IHS 100 discussed above with reference to FIG. 1, and/or may include some or all of the components of the IHS 100. In specific examples, the source code management system 204 may be provided by one or more server devices, and/or other devices that one of skill in the art in possession of the present disclosure would recognize provides for the functionality directed to the service/source code (also called "service code") discussed below. However, while illustrated and discussed as being provided by server device(s), one of skill in the art in possession of the present disclosure will recognize that the source code management system 204 may be provided by a variety of devices that will fall within the scope of the present disclosure as well.

The microservice update system 200 also incudes a build dispatcher system 206 that is coupled to the source code management system 204 (e.g., via one or more networks provided by a Local Area Network (LAN), the Internet, etc.) In an embodiment, the build dispatcher system 206 may be provided by the IHS 100 discussed above with reference to FIG. 1, and/or may include some or all of the components of the IHS 100. In specific examples, the build dispatcher system 206 may be provided by one or more server devices, and/or other devices that one of skill in the art in possession of the present disclosure would recognize provides for the functionality of the build dispatcher systems discussed below. However, while illustrated and discussed as being provided by server device(s), one of skill in the art in possession of the present disclosure will recognize that the build dispatcher system 206 may be provided by a variety of devices that will fall within the scope of the present disclosure as well.

The microservice update system 200 also incudes a continuous integration system 208 that is coupled to the build dispatcher system 206 (e.g., via one or more networks provided by a Local Area Network (LAN), the Internet, etc.)

In an embodiment, the continuous integration system 208 may be provided by the IHS 100 discussed above with reference to FIG. 1, and/or may include some or all of the components of the IHS 100. In specific examples, the continuous integration system 208 may be provided by one or more server devices, and/or other devices that one of skill in the art in possession of the present disclosure would recognize provides for the functionality of the continuous integration systems discussed below. However, while illustrated and discussed as being provided by server device(s), one of skill in the art in possession of the present disclosure will recognize that the continuous integration system 208 may be provided by a variety of devices that will fall within the scope of the present disclosure as well.

The microservice update system 200 also incudes a service provisioning system 210 that is coupled to the continuous integration system 208 (e.g., via one or more networks provided by a Local Area Network (LAN), the Internet, etc.) In an embodiment, the service provisioning system 210 may be provided by the IHS 100 discussed above with reference to FIG. 1, and/or may include some or all of the components of the IHS 100. In specific examples, the service provisioning system 210 may be provided by one or more server devices (e.g., network provisioning "cloud" server devices), and/or other devices that one of skill in the art in possession of the present disclosure would recognize provides for the functionality directed to the cloud-based service provisioning discussed below. In the illustrated embodiment, the service provisioning system 210 includes a plurality of microservices 210*a*, 210*b*, and up to 210*c* that, as discussed above, may be provided by a collection of loosely-coupled, fine-grained code modules operating via lightweight protocols, which provide for modularity that makes a service provided by those microservices 210*a-c* easier to understand, develop, and test, while also providing for resiliency to architecture erosion. As such, autonomous teams of developer(s) may utilize the developer system(s) 202 to develop and scale respective microservices 210*a-c* independently, while allowing the architecture of any individual microservice to emerge through continuous refactoring and/or updating, enabling continuous integration, delivery, and deployment of the microservices that provide their associated service. However, one of skill in the art in possession of the present disclosure will recognize that the service provisioning system 210 will include a variety of other computing components in order to provide the functionality discussed below as well.

The microservice update system 200 also incudes one or more customer systems 212 that are coupled to the service provisioning system 210 (e.g., via one or more networks provided by a Local Area Network (LAN), the Internet, etc.) In an embodiment, the customer system(s) 212 may be provided by the IHS 100 discussed above with reference to FIG. 1, and/or may include some or all of the components of the IHS 100. In specific examples, the customer system(s) 212 may be provided by one or more server devices, and/or other devices that one of skill in the art in possession of the present disclosure would recognize provides for the consuming of the service provided by the service provisioning system as discussed below. However, while illustrated and discussed as server device(s), one of skill in the art in possession of the present disclosure will recognize that the customer system(s) 212 may be provided by a variety of devices that will fall within the scope of the present disclosure as well. While a specific microservice update system 200 has been illustrated and described, one of skill in the art in possession of the present disclosure will recognize that the microservice update system 200 of the present disclosure may include a variety of components and component configurations while remaining within the scope of the present disclosure as well.

Figure 3:
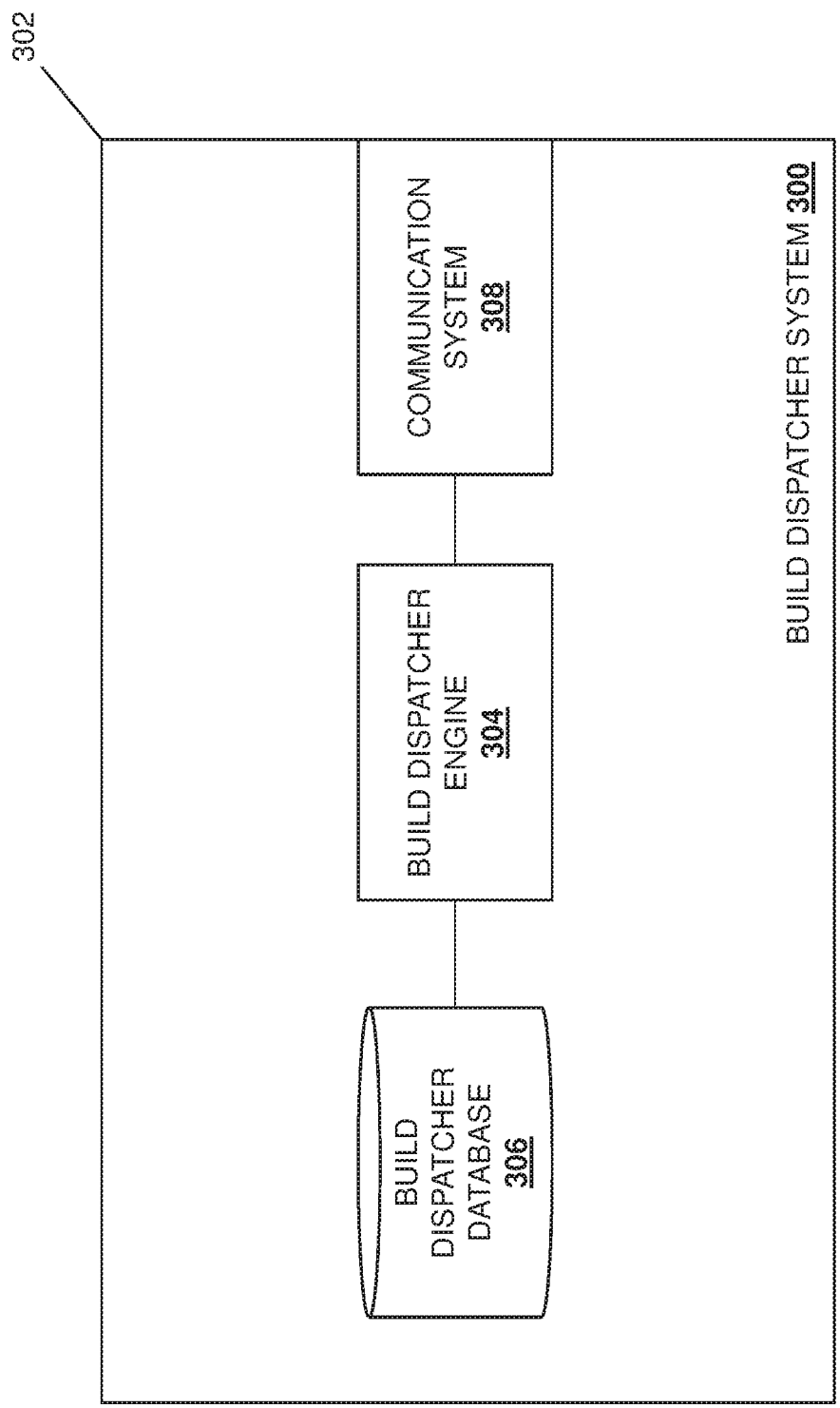
FIG. 3 is a schematic view illustrating an embodiment of a build dispatcher system provided in the microservice update system of FIG. 2.

Referring now to FIG. 3, an embodiment of a build dispatcher system 300 is illustrated that may provide the build dispatcher system 206 discussed above with reference to FIG. 2. As such, the build dispatcher system 300 may be provided by the IHS 100 discussed above with reference to FIG. 1 and/or may include some or all of the components of the IHS 100, and in specific examples may be provided by one or more server devices. Furthermore, while illustrated and discussed as provided by one or more server devices, one of skill in the art in possession of the present disclosure will recognize that the functionality of the build dispatcher system 300 discussed below may be provided by other devices that are configured to operate similarly as discussed below. In the illustrated embodiment, the build dispatcher system 300 includes a chassis 302 that houses the components of the build dispatcher system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a build dispatcher engine 304 that is configured to perform the functionality of the build dispatcher engines and/or build dispatcher systems discussed below.

The chassis 302 may also house a storage system (not illustrated, but which may include the storage 108 discussed above with reference to FIG. 1) that is coupled to the build dispatcher engine 304 (e.g., via a coupling between the storage system and the processing system) and that includes a build dispatcher database 306 that is configured to store any of the information utilized by the build dispatcher engine 304 discussed below. The chassis 302 may also house a communication system 308 that is coupled to the build dispatcher engine 304 (e.g., via a coupling between the communication system 308 and the processing system) and that may be provided by a Network Interface Controller (NIC), wireless communication systems (e.g., BLUETOOTH®, Near Field Communication (NFC) components, Wireless Fidelity (WiFi)@ components, etc.), and/or any other communication components that would be apparent to one of skill in the art in possession of the present disclosure. While a specific build dispatcher system 300 has been illustrated, one of skill in the art in possession of the present disclosure will recognize that build dispatcher systems (or other devices operating according to the teachings of the present disclosure in a manner similar to that described below for the build dispatcher system 300) may include a variety of components and/or component configurations for providing conventional functionality, as well as the functionality discussed below, while remaining within the scope of the present disclosure as well.

Figure 4:
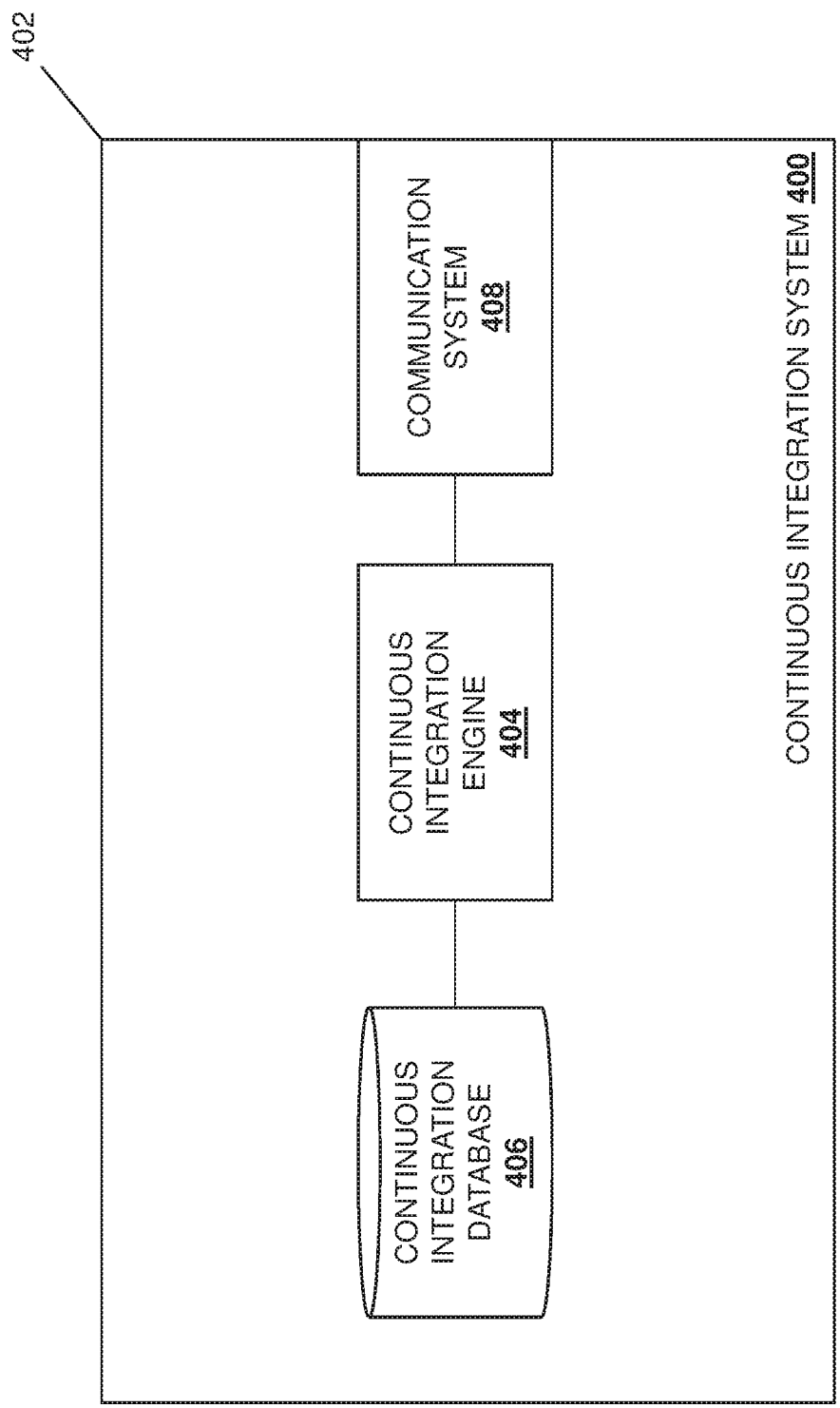
FIG. 4 is a schematic view illustrating an embodiment of a continuous integration system provided in the microservice update system of FIG. 2.

Referring now to FIG. 4, an embodiment of a continuous integration system 400 is illustrated that may provide the continuous integration system 208 discussed above with reference to FIG. 2. As such, the continuous integration system 400 may be provided by the IHS 100 discussed above with reference to FIG. 1 and/or may include some or all of the components of the IHS 100, and in specific examples may be provided by one or more server devices. Furthermore, while illustrated and discussed as provided by one or more server devices, one of skill in the art in possession of the present disclosure will recognize that the functionality of the continuous integration system 400 discussed below may be provided by other devices that are configured to operate similarly as discussed below. In the illustrated embodiment, the continuous integration system 400 includes a chassis 402 that houses the components of the continuous integration system 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a continuous integration engine 404 that is configured to perform the functionality of the continuous integration engines and/or continuous integration systems discussed below.

The chassis 402 may also house a storage system (not illustrated, but which may include the storage 108 discussed above with reference to FIG. 1) that is coupled to the continuous integration engine 404 (e.g., via a coupling between the storage system and the processing system) and that includes a continuous integration database 406 that is configured to store any of the information utilized by the continuous integration engine 404 discussed below. The chassis 402 may also house a communication system 408 that is coupled to the continuous integration engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific continuous integration system 400 has been illustrated, one of skill in the art in possession of the present disclosure will recognize that continuous integration systems (or other devices operating according to the teachings of the present disclosure in a manner similar to that described below for the continuous integration system 400) may include a variety of components and/or component configurations for providing conventional functionality, as well as the functionality discussed below, while remaining within the scope of the present disclosure as well.

Figure 5A:
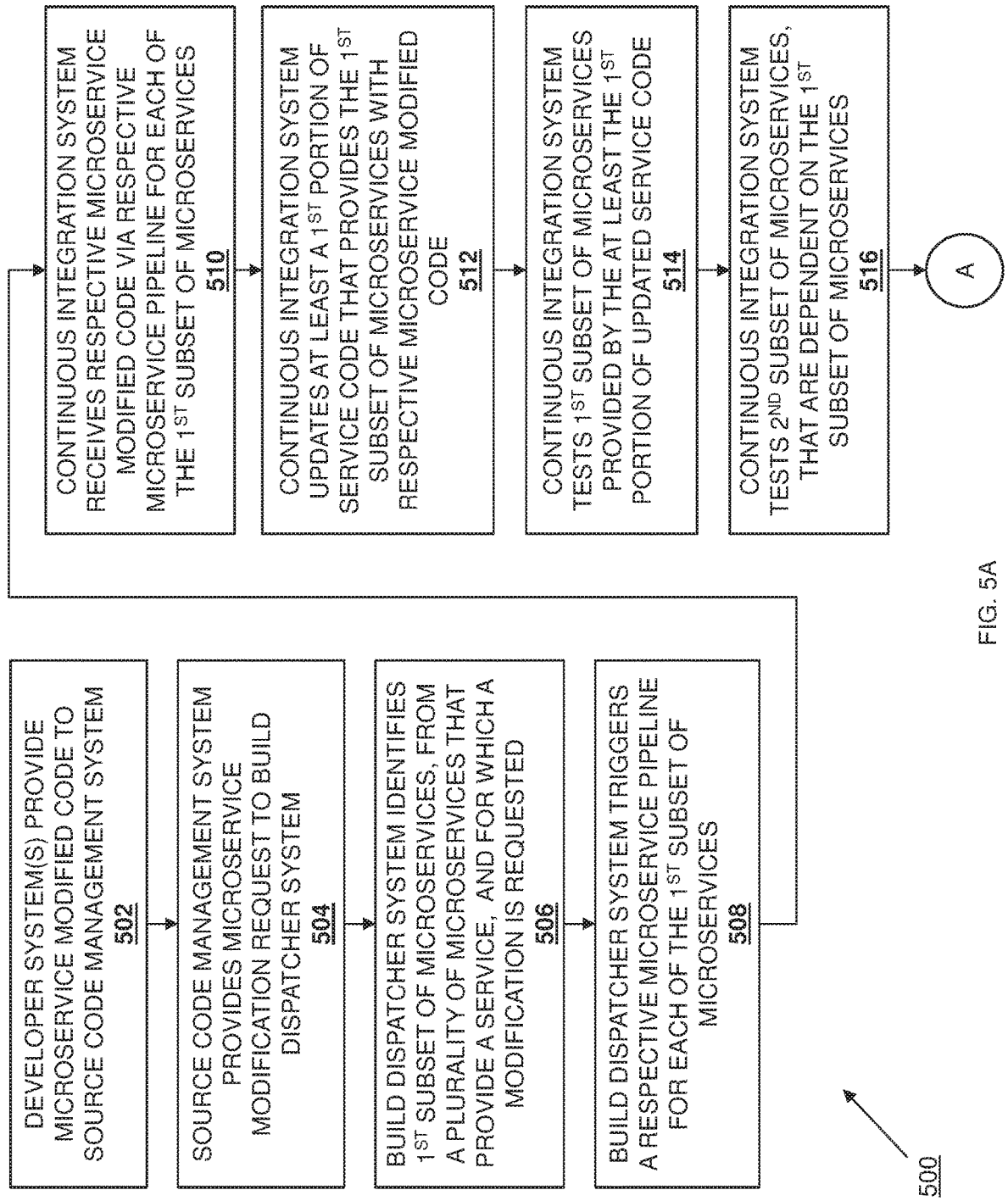
FIG. 5A is a flow chart illustrating an embodiment of a portion of a method for updating microservices.
Figure 5B:
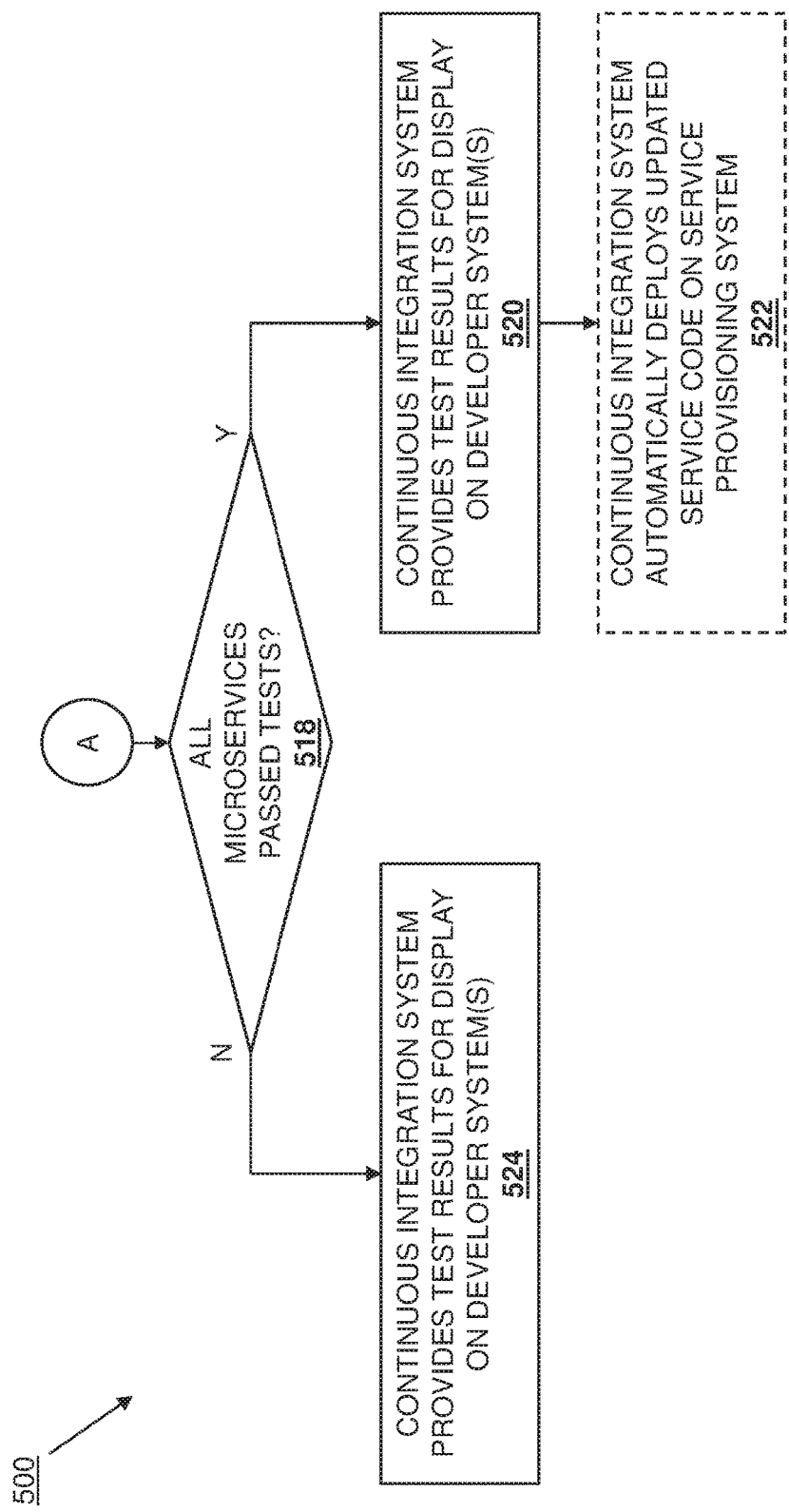
FIG. 5B is a flow chart illustrating an embodiment of a portion of a method for updating microservices.

Referring now to FIG. 5, an embodiment of a method for updating microservices is illustrated. As discussed below, the systems and methods of the present disclosure provide for the more efficient updating of microservice(s) that are provided by service code and that enable a service by limiting of the updating that is performed on that service code to the updating of portions of that service code that provide microservices that are being modified (e.g., with microservice modified code), and then testing only the microservices that have been modified along with microservices that are dependent on the microservices that have been modified. For example, developers may utilize developer systems to provide microservice modified code to a source code management system along with a push request or merge request that causes the source code management system to send a microservice modification request to a build dispatcher system. In response to receiving the microservice modification request, the build dispatcher system may identify a first subset of microservices (from a plurality of microservices that provide a service) for which modification has been requested (i.e., via the microservice modification request and/or the microservice modified code), and may trigger a respective microservice pipeline for each of that first subset of microservices.

A continuous integration system will then receive the microservice modified code for each of the first subset of microservices via their respective microservice pipelines, and will operate to update at least a first portion of the service code that provides the first subset of microservices with that respective microservice modified code. The continuous integration system will then test the first subset of microservices provided by the first portion of updated service code, as well as a second subset of microservices (from the plurality of microservices that provide the service) that are dependent on the first subset of microservices. The continuous integration system will then provide the results of the testing for display to the developers via their developer systems and, if the tests were passed, may automatically deploy the updated service code on a service provisioning system so that the service may be provided to customer(s) via their customer device(s). As such, more efficient updating of services in response to modification of one or more of their microservices is provided, with relatively shorter build times needed for the modification of individual microservices that consume relatively smaller amounts of resources that can enhance the ability to perform parallel build operations via the microservice manufacturing chain.

Figure 6:
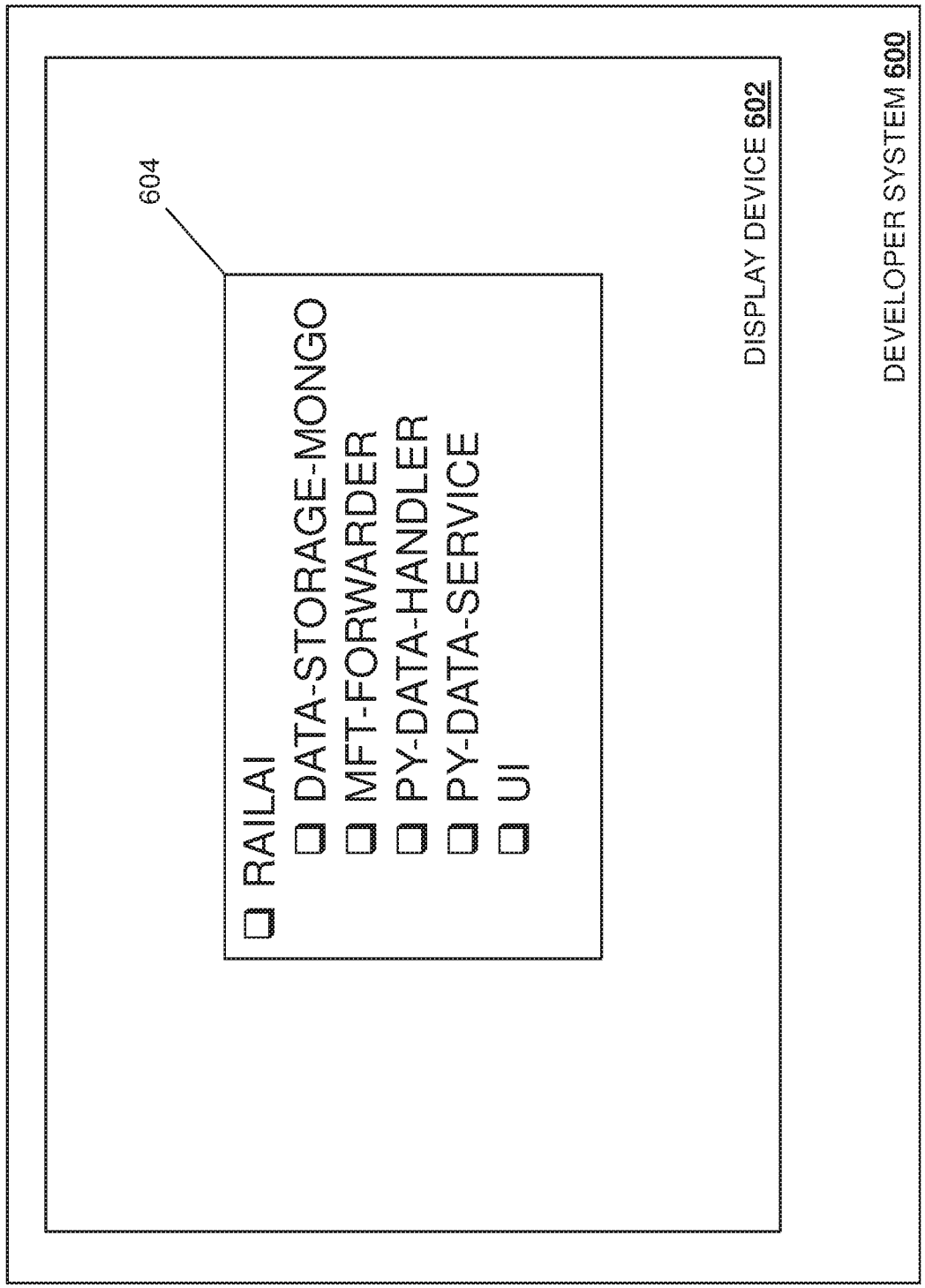
FIG. 6 is a schematic view illustrating an embodiment of a code repository screen displayed on a developer system provided in the microservice update system of FIG. 2.

The method 500 begins at block 502 where developer system(s) provide microservice modified code to a source code management system. In an embodiment, at block 502, developer(s) may utilize the developer system(s) 202 in order to provide microservice modified code that is configured to modify any of a plurality of the microservices 210a-210c that enable the service provisioning system 210 to provide a service. With reference to FIG. 6, a developer system 600 including a display device 602 (which may be any of the developer system(s) 202 including the display device 202a illustrated in FIG. 2) is illustrated displaying an embodiment of a code repository screen 604 that displays a hierarchy for service code that enables a service provided by the service provisioning system 210. In the specific example illustrated in FIG. 6, the code repository screen 604 illustrates how a "RAILAI" service includes five microservices: a "DATA-STORAGE-MONGO" microservice, an "MFT-FORWARDER" microservice, a "PY-DATA-HANDLER" microservice, a "PY-DATA-SERVICE" microservice, and a "UI" microservice. For example, the "RAILAI" service may be provided by a folder that includes five subfolders that are the roots of the five microservices discussed above. However, while a specific service and microservices are illustrated and described for the purposes of the examples provided below, one of skill in the art in possession of the present disclosure will recognize that a service, its associated service code, and the microservices that provide that service may be organized in a variety of manners that will fall within the scope of the present disclosure as well.

As such, at block 502 and with reference to the examples of the service and microservices discussed above, a developer may utilize their developer subsystem 202 to provide microservice modified code for the "MFT-FORWARDER" microservice and the "PY-DATA-HANDLER" microservice to the source code management system 204. Furthermore, along with the microservice modified code, at block 502 the developer may use the developer system 202 to provide a request to incorporate the microservice modified code into the service code that provides the service. Continuing with the examples of the service and microservices discussed above, at block 502 the developer may use the developer system 202 to provide a "push" request, a "merge" request, and/or other requests known in the art, in order to request that the microservice modified code for the "MFT-FOR-WARDER" microservice and the "PY-DATA-HANDLER" microservice be incorporated into the "RAILAI" service.

The method 500 then proceeds to block 504 where the source code management system provides a microservice modification request to a build dispatcher system. In an embodiment, at block 504, the source code management system 204 may generate a microservice modification request and provide that microservice modification request to the build dispatcher system 206. For example, source code management system 204 may be configured with a "webhook" that is triggered in response to receiving the push request or merge request discussed above, and that webhook may provide for the sending of a Hyper Text Transfer Protocol (HTTP) request to the build dispatcher system 206 that provides the microservice modification request at block 504. For example, the HTTP request that provides the microservice modification request may include and/or identify information (e.g., via a build request payload) about the microservice(s) for which the microservice modified code was provided in the source code management system 204 at block 502. However, while a particular microservice modification request has been described, one of skill in the art in possession of the present disclosure will recognize that requests to modify microservices may be provided to the build dispatcher system 206 in a variety of manners that will fall within the scope of the present disclosure as well.

The method 500 then proceeds to block 506 where the build dispatcher system identifies a first subset of microservices, from a plurality of microservices that provide a service, and for which a modification is requested. In an embodiment, at block 506, the build dispatcher engine 304 in the build dispatcher system 300 may receive the microservice modification request (e.g., the HTTP request discussed above) via its communication system 308 and, in response, may analyze the HTTP request to determine, from the plurality of microservices 210a-c that provide the service discussed above, a first subset of microservices for which a modification is being requested. For example, at block 506 the build dispatcher engine 304 may analyze a build request payload included with or identified by the HTTP request that provides the microservice modification request, and may determine the first subset of microservices for which the modification is being requested based on that analysis. In some embodiments, the operations of the build dispatcher engine 304 at block 506 may differ depending on whether the microservice modification request was provided in response to push request from the developer at block 502, or was provided in response to a merge request from the developer at block 502.

For example, in the event the microservice modification request (e.g., an HTTP request) includes a request header that indicates that it is associated with a merge request (e.g., the "webhook" discussed above is a merge request webhook), the build dispatcher engine 304 may operate to extract, from the build request payload, one or more source branches that include the microservice modified code provided by the developer(s), a target branch with which the source branch(es) are requested to be merged with, a git Secure SHell (SSH) Uniform Resource Locator (URL) for the source code repository, a project identification number (e.g., in Gitlab), a most recent commit, email address(es) for the developer(s) that submitted the merge request, and/or other a variety of other information that would be apparent to one of skill in the art in possession of the present disclosure. However, while an example of information retrieved in response to a merge request is detailed above, one of skill in the art in possession of the present disclosure will recognize the information that may be retrieved by the build dispatcher engine 304 in response to a push request, and thus the retrieval of that information will fall within the scope of the present disclosure as well Continuing with the example above where the microservice modification request (e.g., an HTTP request) is associated with a merge request, at block 506 the build dispatcher engine 304 in the build dispatcher system 300 may operate to create a child thread and treat the microservice modification request by, for example, cloning the source code repository and calculating the difference between the source branch(es) and the target branch using, for example, a "git diff" operation with a "name-only" flag (e.g., "—name-only") set. As will be understood by one of skill in the art in possession of the present disclosure, the use of the git diff operation with the name-only flag in the manner described above will return a list of file path(s) which have been modified. Continuing with the specific example provided above in which the developer is requesting the modification of the "MFT-FORWARDER" microservice and the "PY-DATA-HANDLER" microservice, the use of the "git diff" operation with the "name-only" flag may return a list of two file paths:
MFT-FORWARDER/setup.py
PY-DATA-HANDLER/setup.py However, while a specific example of identifying the first subset of microservices for which a modification is requested has been described, one of skill in the art in possession of the present disclosure will recognize that modified microservices may be identified using other techniques that will fall within the scope of the present disclosure as well.

The method 500 then proceeds to block 508 where the build dispatcher system triggers a respective microservice pipeline for each of the first subset of microservices. In an embodiment, at block 508, the build dispatcher engine 304 in the build dispatcher system 300 may operate to trigger respective microservice pipeline(s) for each of the first subset of microservices identified as discussed above. For example, at block 508 and continuing with the specific example discussed above, the build dispatcher engine 304 may process the list of two file paths (e.g., the "MFT-FORWARDER/setup.py" and "PY-DATA-HANDLER/setup.py" file paths discussed above) to retrieve only the root path folders for "MFT-FORWARDER" and "PY-DATA-HANDLER", and may then iterate over the list of microservice(s) in order to trigger corresponding pipelines for each microservice to the continuous integration system 208. This contrasts with conventional systems, which do not provide the ability to create pipelines on a microservice basis (e.g., that can be placed at the root of the corresponding microservice folder), and instead only allow for the creation of a single pipeline file that applies to the entire service/source code.

For example, the continuous integration system 208/400 may include an automation server engine that is part of the continuous integration engine 404 and that is configured to automate portions of the software development process in order to provide continuous integration and/or facilitate technical aspects of continuous delivery. In the specific examples discussed below, the automation server engine is provided by JENKINS open-source software, although one of skill in the art in possession of the present disclosure will recognize that a variety of server automation subsystems will fall within the scope of the present disclosure as well. In such examples, the corresponding pipelines for each microservice may be triggered via the JENKINS Application Programming Interface (API) by providing a pipeline name in JENKINS, and a payload with the parameters of the pipeline(s). Furthermore, in order to configure the pipeline call, the build dispatcher engine 304 in the build dispatcher system 300 may utilize a dictionary that maps microservice names to their corresponding parameters, code for an example of which is provided below:

```
{'py-data-handler': {pipeline': 'py-data-handler',
        'payload': {
            'branchName': source_branch,
            'appName': 'py-data-handler',
            'pyPath': 'py_py_data_handler',
            'userEmail': user_email,
            'projectId': project_id,
            'commitId': commit_id
        }
    },
    {'mft-forwarder': {pipeline': 'mft-forwarder',
        'payload': {'branchName': source_branch,
            'appName': 'mft-forwarder',
            'pyPath': 'mft-forwarder',
            'userEmail': user_email,
            'projectId': project_id,
            'commitId': commit_id
        }
    },
    {'py-data-service: {pipeline': 'py-data-service,
        'payload': {'branchName': source_branch,
            'appName': 'py-data-service,
            'pyPath': 'py-data-service,
            'userEmail': user_email,
            'projectId': project_id,
            'commitId': commit_id
        }
    },
    {'ui': {pipeline': 'railai-ui',
        payload': {'branchName': source_branch,
            'appName': 'ui',
            'userEmail': user_email,
            'projectId': project_id,
            'commitId': commit_id
        }
    },
}
```

One of skill in the art in possession of the present disclosure will recognize that the keys of the dictionary above are the microservice root folder names, and the values are the parameters, including the pipeline name in JENKINS (which may be configured in the URL), and the payload that is passed to the pipeline to fill its variables, with those variables including the branch name to checkout, the application name to set the working directory, the Python path to configure Python custom imports, the user email to notify the developer of the pipeline progress, and the project identifier (ID) and commit ID to update the commit (e.g., in Gitlab) with the result of the pipeline (e.g., in-progress, running, failed, aborted, etc.) In this specific example, parameters may be passed to the pipeline because the pipeline is unique for all the microservices. Furthermore, one of skill in the art in possession of the present disclosure will recognize that the examples of microservices above are all coded in the Python programming language, and thus may all follow a standard code organization so that they may be built following the same steps, with only the configuration (provided by the payload) differing. However, one of skill in the art in possession of the present disclosure will also recognize how microservices coded in different programming languages may be utilized with minor modifications that will fall within the scope of the present disclosure as well.

The method 500 then proceeds to block 510 where a continuous integration system receives respective microservice modified code via the respective microservice pipeline for each of the first subset of microservices, and then proceeds to block 512 where the continuous integration system updates at least a first portion of service code that provides the first subset of microservices with the respective microservice modified code. In an embodiment, at block 510, the continuous integration engine 404 in the continuous integration system 208/400 may receive respective microservice modified code (e.g., provided by the developer(s) at block 502) via the respective microservice pipelines for each of the first subset of microservices that were triggered at block 508. Furthermore, in an embodiment of block 512, the continuous integration engine 404 in the continuous integration system 208/400 uses that microservice modified code received via the microservice pipelines to update at least a first portion of service code that provides that first subset of microservices.

As such, continuing with the specific example provided above, at blocks 510 and 512, the continuous integration engine 404 in the continuous integration system 208/400 may operate to update a first portion of service code that provides the "MFT-FORWARDER" microservice and the "PY-DATA-HANDLER" microservice with the microservice modified code that was provided by the developer(s) at block 502. One of skill in the art in possession of the present disclosure will recognize that the updating of the service code with the microservice modified code may be handled by a code versioning system, and are not described herein in detail. As such, the other microservices that provide the service (e.g., the "DATA-STORAGE-MONGO" microservice, the "PY-DATA-SERVICE" microservice, and the "UI" microservice illustrated in FIG. 6) are not processed to update any portion of the service code because they were not modified via the merge requests discussed above. One of skill in the art in possession of the present disclosure will recognize that the modification of microservices that provide a service in such a manner will result in faster build times, as less code is processed to implement the modifications, while also consuming fewer resources in order to execute the build. Thus, for any particular build/software modification environment, more builds may be performed in parallel using the techniques of the present disclosure due to the more efficient utilization of resources in that build/software environment.

The method 500 then proceeds to block 514 where the continuous integration system tests the first subset of microservices provided by the at least first portion of the updated service code. In an embodiment, at block 514, the continuous integration engine 404 in the continuous integration system 208/400 may operate to test the first subset of microservices that are provided by the at least first portion of the service code that was updated at block 512. Continuing with the example provided above, the continuous integration engine 404 may test the "MFT-FORWARDER" microservice and the "PY-DATA-HANDLER" microservice that are provided by first portion(s) of the service code and that were updated using the microservice modified code at block 512. As would be understood by one of skill in the art in possession of the present disclosure, the testing of the portion(s) of the service code that were modified at block 512 may include a variety of other testing operations known in the art, discussed in further detail below.

The method 500 then proceeds to block 516 where the continuous integration system tests a second subset of microservices that are dependent on the first subset of microservices. In an embodiment, at block 516, the continuous integration engine 404 in the continuous integration system 208/400 may operate to test a second subset of microservices that are dependent on the first subset of microservices that were modified, and that may be provided by at least a second portion of the service code that was not updated at block 512. Continuing with the example provided above, the continuous integration engine 404 may test the "PY-DATA-SERVICE" microservice that is provided by second portion(s) of the service code that were not updated at block 512. As would be understood by one of skill in the art in possession of the present disclosure, the testing of the portion(s) of the service code that are dependent on the microservices that were updated at block 512 may include testing any second microservice(s) that consume outputs that are generated by the first microservice(s) that were modified, and performing a variety of testing operations known in the art, discussed in further detail below. As such, in some examples, any microservices that are downstream of a modified microservice may be tested at block 514. Furthermore, while illustrated and discussed as being performed separately, at least some of the testing at blocks 514 and 516 may be performed in parallel while remaining within the scope of the present disclosure as well.

For example, the testing operation performed at blocks 512 and 514 may include performing a unit test using "mock and stubbing" techniques that operate to replace dependencies (e.g., in a database). As would be understood by one of skill in the art in possession of the present disclosure, a unit test may be run quickly and does not require deployment the code being tested. Subsequently, integration tests may be performed in which the microservice being tests is deployed to a Pivotal Cloud Foundary (PCF) together with its dependent microservices, and REpresentational State Transfer (REST) requests are sent to the micro-service REST Application Programming Interfaces (APIs) so that corresponding replies may be verified (e.g., via verification of http status, the payload which contains messages and results, and/or other reply information known in the art). The testing operations may also include the checking of records in databases in case the APIs discussed above persist some information, ensuring that messages exchanged by microservices were processed and/or sent/received successfully by verifying that these dependent microservices also operated according to their expected logic (e.g., by processing and persisting a record in a database).

Continuing with the specific example discussed above in which the "MFT-FORWARDER" microservice and the "PY-DATA-HANDLER" microservice were modified and include the "PY-DATA-SERVICE" microservice that is dependent on at least one of them, those microservices may be provided in a chain where the "PY-DATA-SERVICE" microservice depends on the "PY-DATA-HANDLER" microservice, which further depends on the "MFT-FORWARDER" microservice. When the build dispatcher system 206/300 receives the microservice modification request and retrieves microservice modified code for each of the "MFT-FORWARDER" microservice and the "PY-DATA-HANDLER" microservice, the build dispatcher system 206/300 may trigger two builds in parallel: a first build for the "MFT-FORWARDER" microservice that will deploy the "MFT-FORWARDER" microservice, the "PY-DATA-HANDLER" microservice, and the "PY-DATA-SERVICE" microservice and run the testing discussed above. The build will use the code branch which includes the microservice modified code for the "MFT-FORWARDER" microservice and the "PY-DATA-HANDLER" microservice, and the testing operations will exercise the microservice modified code for the "MFT-FORWARDER" microservice along with the microservice modified code for the "PY-DATA-HANDLER" microservice, while also verifying that the microservice modified code integrates with the "PY-DATA-SERVICE" microservice (even though no modifications have been made to the "PY-DATA-SERVICE" microservice). Furthermore, a second build will be triggered by the build dispatcher system 206/300 for the "PY-DATA-HANDLER" microservice, which will deploy the "PY-DATA-HANDLER" microservice and the "PY-DATA-SERVICE" microservice and run the testing discussed above as well.

The method 500 then proceeds to decision block 518 where the continuous integration system determines whether all the microservices that provide the service have passed the tests. In an embodiment, at decision block 518, the continuous integration engine 404 in the continuous integration system 208/400 may operate to determine whether each microservice that was tested at blocks 514 and 516 has passed that test (e.g., by determining whether that microservice is performing desired functionality such as the generation of expected outputs discussed above.) If, at decision block 518, the continuous integration system determines that all the microservices that provide the service have passed the tests, the method 500 proceeds to block 520 where the continuous integration system provides the test results for display on the developer subsystem(s). In an embodiment, at block 520 and in response to determining that all the microservices tested at blocks 514 and 516 have passed those tests, the continuous integration engine 404 in the continuous integration system 208/400 may generate test results and provide those test results for display on the developer system(s) 202. For example, as would be understood by one of skill in the art in possession of the present disclosure and with reference to the examples provided above, when a microservice pipeline completes, the continuous integration engine 404 in the continuous integration system 208/400 may update the commit with the build request provided by the merge request, which allows a developer to use their respective developer system 202 to verify which microservices (i.e., the first subset of microservices discussed above) were rebuilt as part of the code change, as well as the results of running each microservice pipeline.

Figure 7:
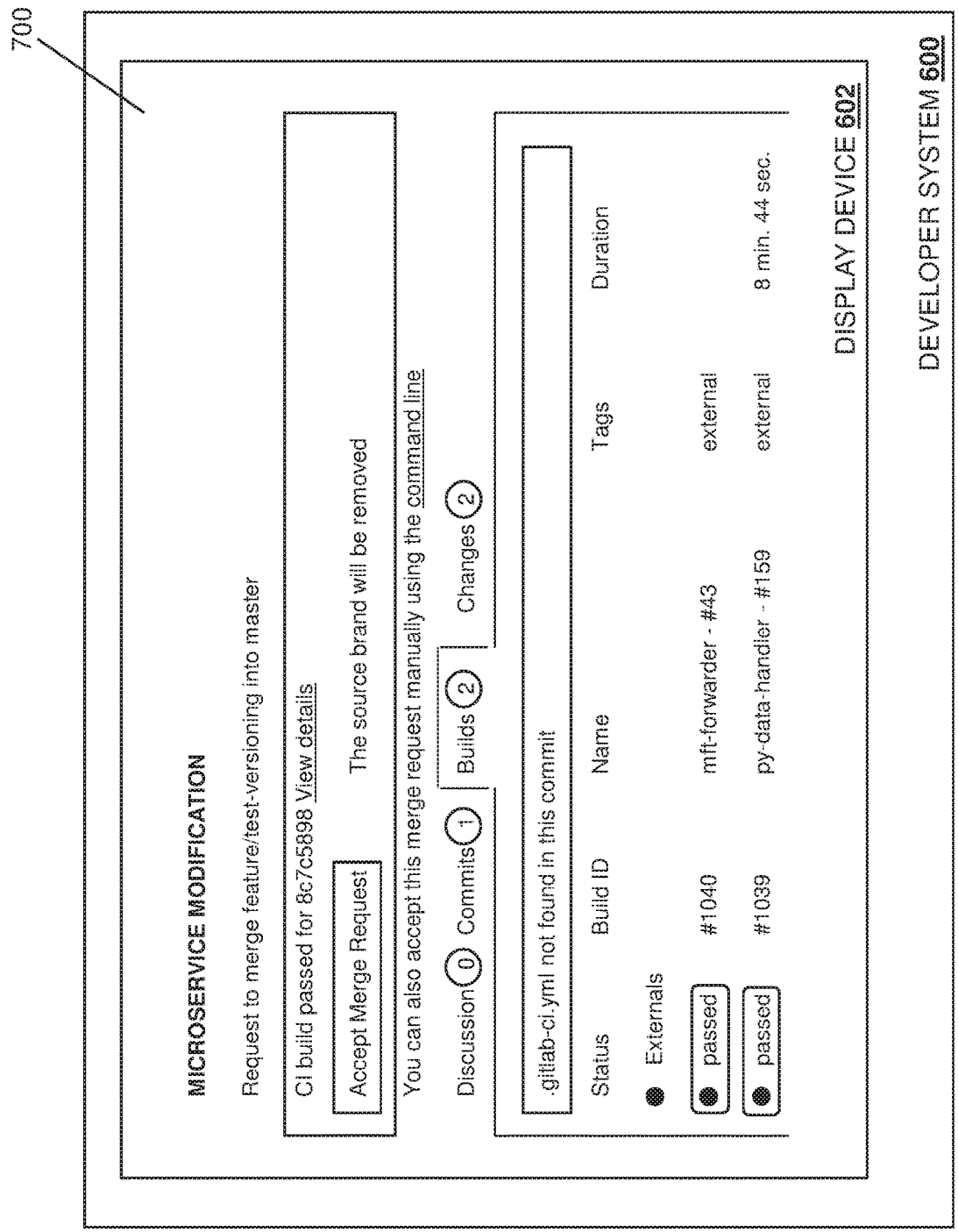
FIG. 7 is a schematic view illustrating an embodiment of a microservice update result screen displayed on a developer system provided in the microservice update system of FIG. 2.

For example, with reference to FIG. 7, the developer system 600 is illustrated as providing a microservice update result screen 700 that, in the illustrated embodiment, provides the test results of updating the "MFT-FORWARDER" microservice and the "PY-DATA-HANDLER" microservice discussed above. As can be seen in the microservice update result screen 700, the developer may check the two builds associated with the latest commit of their merge request, which in the illustrated embodiment indicates that the "MFT-FORWARDER" microservice and the "PY-DATA-HANDLER" microservice have been updated and have passed their testing.

The method 500 may then proceed to optional block 522 where the continuous integration system automatically deploys updated service code on a service provisioning system. In an embodiment, at optional block 522, the continuous integration engine 404 in the continuous integration system 208/400 may operate to automatically deploy the updated service code on service processing system 210 such that that service processing system 210 may provide its associated service (e.g., via the microservices 210*a-c*, at least some of which have been updated) to the customer system(s) 212. In another example, the deployment of the updated service code may be in response to the developer selecting an "ACCEPT MERGE REQUEST" button on the microservice update result screen 700.

Figure 8:
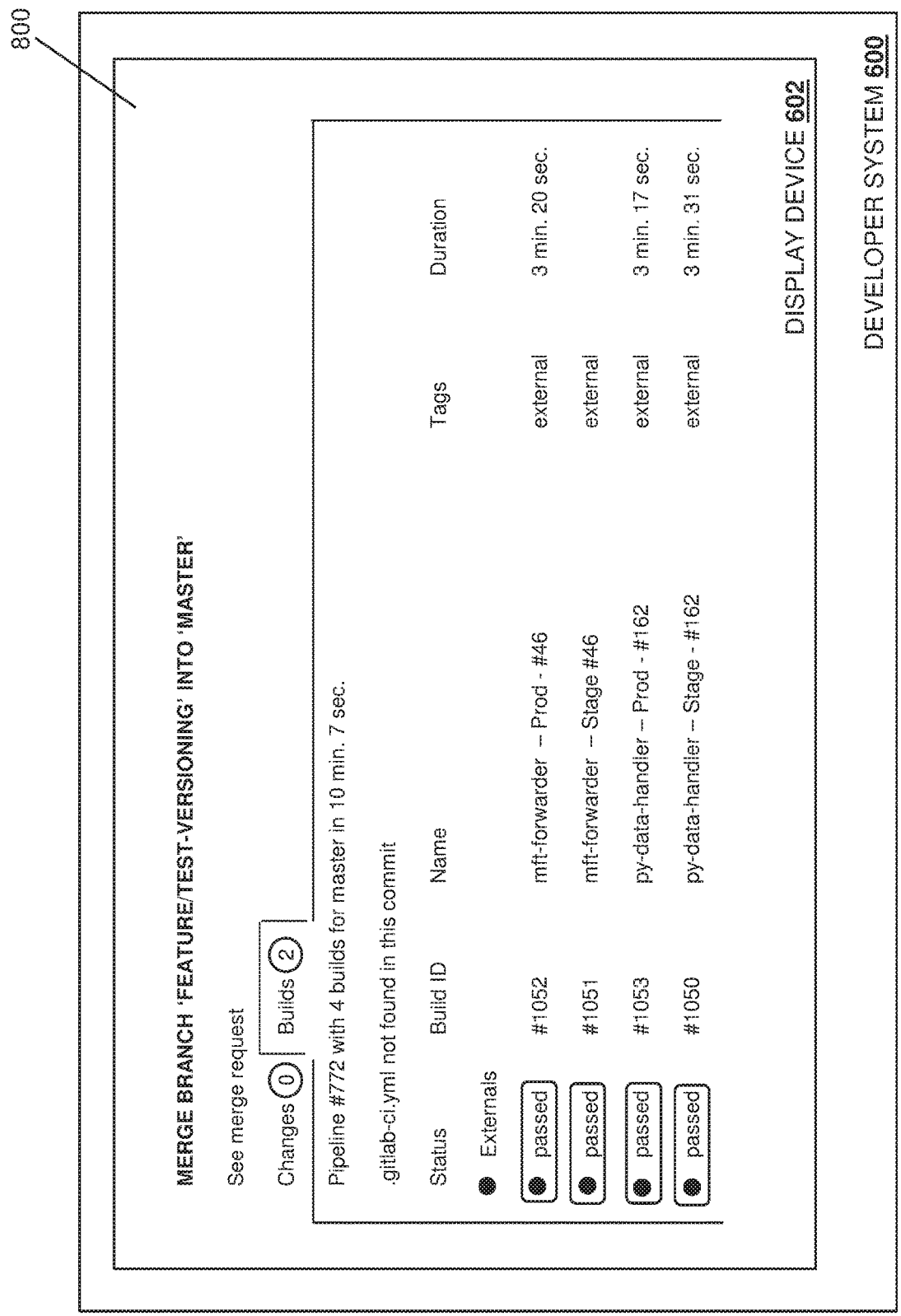
FIG. 8 is a schematic view illustrating an embodiment of a microservice update result screen displayed on a developer system provided in the microservice update system of FIG. 2.

With reference to FIG. 8, the developer system 600 is illustrated as providing a microservice update result screen 800 that, in the illustrated embodiment, provides the test results of updating the "MFT-FORWARDER" microservice and the "PY-DATA-HANDLER" microservice discussed above. As would be understood by one of skill in the art in possession of the present disclosure, when the source branch is merged to the master branch, the developer may again be notified so that they may verify the results of the builds that were triggered on the master branch. As such, continuing with the specific example discussed above, after the developer merged the updated service code with the master branch, the merge commit build update may be verified (e.g., in Gitlab) to confirm that the "MFT-FORWARDER" microservice and the "PY-DATA-HANDLER" microservice have been updated and deployed to the stage and production environments successfully. As can be seen in the microservice update result screen 700, the developer may check the update of the stage and production environments the "MFT-FORWARDER" microservice and the "PY-DATA-HANDLER" microservice updates, which indicate that each have been updated and have passed their testing.

If at decision block 518, the continuous integration system determines that at least one of the microservices that provide the service have not passed the tests, the method 500 proceeds to block 524 where the continuous integration system provides the test results for display on the developer subsystem(s). In an embodiment, at block 524 and in response to determining at least one the microservice(s) did not pass the testing at blocks 514 and/or 516, the continuous integration engine 404 in the continuous integration system 208/400 may generate and provide microservice update results screens on the developer system(s) 202/600 that are similar to those illustrated in FIGS. 7 and 8, but that indicate which of the microservices did not pass their testing. As such, developer(s) are informed when their attempts to update/modify their microservices are unsuccessful or will otherwise introduce an issue with the operation of the service code and the provisioning of the service by the service provisioning system 210 to the customer system(s) 212.

In specific implementations, the systems and methods of the present disclosure may require developers that create a new microservice to add an entry to a map in the build dispatcher system 206 that allows for the configuration of the pipeline (e.g., via JENKINS as discussed above) and the pipeline parameters, as well as create a new pipeline (which may be performed in JENKINS via the cloning of an existing pipeline.) Furthermore, when developers are added or removed from a team of developers that are authorized to modify microservices that provide a service, a user/developer configuration file in the build dispatcher system 206 may need to be updated in order to add/remove their associated email address, user identifier, and security token (e.g., in JENKINS), which is information that may be utilized to authenticate the build-triggering HTTP requests and for documenting information related to the build (e.g., in JENKINS). Further still, one of skill in the art in possession of the present disclosure will recognize how, when the build dispatcher system 206 is provided via a Python application, it may be deployed using PIP, and may be registered in LINUX "systemd" in order to allow LINUX to manage the application during runtime.

Thus, systems and methods have been described that provide for the selective building of modified microservices provided by service code that enables a service, providing for more efficient updating of microservices by limiting of the updating that is performed on that service code to the updating of portions of that service code that provide microservices that are being modified (e.g., with microservice modified code), and then testing only the microservices that have been modified and the microservices that are dependent on the microservices that have been modified. For example, in response to receiving a microservice modification request, the build dispatcher system may identify a first subset of microservices (from a plurality of microservices that provide a service) for which modification has been requested, and may trigger a respective microservice pipeline for each of the first subset of microservices. A continuous integration system will then receive the microservice modified code for each of the first subset of microservices via their respective microservice pipelines, and will operate to update at least a first portion of the service code that provides the first subset of microservices with the respective microservice modified code. The continuous integration system will then test the first subset of microservices provided by the first portion of updated service code, as well as test a second subset of microservices (from the plurality of microservices that provide the service) that are dependent on the first subset of microservices. The continuous integration system will then provide the results of the testing for display to the developers via their developer systems and, if the tests were passed, may automatically deploy the updated service code on a service provisioning system so that the service may be provided to customer(s) via their customer device(s). As such, more efficient updating of services in response to modification of one or more of their microservices is provided, with relatively shorter build times provided for the modification of individual microservices that consume relatively smaller amounts of resources that can enhance the ability to perform parallel build operations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A microservice update system, comprising:
a build dispatcher system that includes:
  a first non-transitory memory; and
  a first processor that is coupled to the first non-transitory memory and that is configured to read instructions from the first non-transitory memory to cause the builder dispatcher system to be configured to:
  receive a microservice modification request;
  identify a first subset of microservices that are included in a plurality of microservices that are configured to provide a service, and for which a modification has been requested in the microservice modification request; and
  trigger, for each of the first subset of microservices, a respective microservice pipeline that is associated with a respective root of a respective microservice folder for each of the first subset of microservices; and a continuous integration system that is coupled to the build dispatcher system and that includes:
  a second non-transitory memory; and
  a second processor that is coupled to the first non-transitory memory and that is configured to read instructions from the first non-transitory memory to cause the continuous integration system to be configured to:
    receive, via the respective pipeline triggered for each of the first subset of microservices, respective microservice modified code for each of the first subset of microservices;
    update, using the respective microservice modified code for each of the first subset of microservices, at least one first portion of service code that provides the first subset of microservices for the service, wherein the updating provides updated service code; and
    test the updated service code in order to test:
      the first subset of microservices that are provided by the at least one first portion of the updated service code; and
      a second subset of microservices that are included in the plurality of microservices that are configured to provide the service, that are provided by at least one second portion of the updated service code that was not updated as part of the updating, and that are dependent on at least one of the first subset of microservices.

2. The system of claim 1, wherein the continuous integration system is configured to:
  determine, in response to the testing of the updated service code, that each of the first subset of microservices and the second subset of microservice have passed the testing; and
  provide, for display on a developer system, an indication that each of the first subset of microservices and the second subset of microservice have passed the testing.

3. The system of claim 1, wherein the continuous integration system is configured to:
  automatically deploy, to a service provisioning system in response to determining that each of the first subset of microservices and the second subset of microservices have passed the testing, the updated service code.

4. The system of claim 1, wherein the continuous integration system is configured to:
  determine, in response to the testing of the updated service code, that at least one of the first subset of microservices and the second subset of microservices have not passed the testing; and
  provide, for display on a developer system, an indication that at least one of the first subset of microservices and the second subset of microservices have not passed the testing.

5. The system of claim 1, wherein the second subset of microservices are dependent on the at least one subset of microservices based on the second subset of microservices utilizing at least one output generated by the at least one subset of microservices during the testing.

6. The system of claim 1, wherein the first subset of microservices includes at least two microservices, and wherein the updating of the at least one first portion of service code that provides the first subset of microservices for the service includes updating the at least two microservices included in the first subset of microservices in parallel.

7. An Information Handling System (IHS), comprising:
  a memory system that includes a non-transitory memory; and
  a processing system that includes a processor that is coupled to the memory system and that is configured to read instructions from the non-transitory memory to cause the processing system to provide a continuous integration engine that is configured to:
    receive, for each of a first subset of microservices that are included in a plurality of microservices that are configured to provide a service and for which a modification has been requested and via a respective pipeline triggered for each of the first subset of microservices, respective microservice modified code for each of the first subset of microservices, wherein each respective pipeline is associated with a respective root of a respective microservice folder for each of the first subset of microservices;
    update, using the respective microservice modified code for each of the first subset of microservices, at least one first portion of service code that provides the first subset of microservices for the service, wherein the updating provides updated service code; and
    test the updated service code in order to test:
      the first subset of microservices that are provided by the at least one first portion of the updated service code; and
      a second subset of microservices that are included in the plurality of microservices that are configured to provide the service, that are provided by at least one second portion of the updated service code that was not updated as part of the updating, and that are dependent on at least one of the first subset of microservices.

8. The IHS of claim 7, wherein the continuous integration engine is configured to:
  determine, in response to the testing of the updated service code, that each of the first subset of microservices and the second subset of microservice have passed the testing; and
  provide, for display on a developer system, an indication that each of the first subset of microservices and the second subset of microservice have passed the testing.

9. The IHS of claim 8, wherein the continuous integration engine is configured to:
  automatically deploy, to a service provisioning system in response to determining that each of the first subset of microservices and the second subset of microservices have passed the testing, the updated service code.

10. The IHS of claim 7, wherein the continuous integration engine is configured to:
  determine, in response to the testing of the updated service code, that at least one of the first subset of microservices and the second subset of microservices have not passed the testing; and
  provide, for display on a developer system, an indication that at least one of the first subset of microservices and the second subset of microservices have not passed the testing.

11. The IHS of claim 7, wherein the second subset of microservices are dependent on the at least one subset of microservices based on the second subset of microservices utilizing at least one output generated by the at least one subset of microservices during the testing.

12. The IHS of claim 7, wherein the first subset of microservices includes at least two microservices, and wherein the updating of the at least one first portion of service code that provides the first subset of microservices for the service includes updating the at least two microservices included in the first subset of microservices in parallel.

13. The IHS of claim 7, wherein the processor is configured to read instructions from the non-transitory memory system to cause the processing system to provide a build dispatcher engine that is configured to:
receive a microservice modification request;
identify the first subset of microservices that are included in the plurality of microservices that are configured to provide the service, and for which the modification has been requested in the microservice modification request; and
trigger, for each of the first subset of microservices, the respective microservice pipeline that causes the continuous integration engine to receive the respective microservice modified code for each of the first subset of microservices.

14. A method for updating microservices, comprising:
receiving, by a continuous integration system for each of a first subset of microservices that are included in a plurality of microservices that are configured to provide a service and for which a modification has been requested and via a respective pipeline triggered for each of the first subset of microservices, respective microservice modified code for each of the first subset of microservices, wherein each respective pipeline is associated with a respective root of a respective microservice folder for each of the first subset of microservices;
updating, by the continuous integration system using the respective microservice modified code for each of the first subset of microservices, at least one first portion of service code that provides the first subset of microservices for the service, wherein the updating provides updated service code; and
testing, by the continuous integration system, the updated service code in order to test:
the first subset of microservices that are provided by the at least one first portion of the updated service code; and
a second subset of microservices that are included in the plurality of microservices that are configured to provide the service, that are provided by at least one second portion of the updated service code that was not updated as part of the updating, and that are dependent on at least one of the first subset of microservices.

15. The method of claim 14, further comprising:
determining, by the continuous integration system in response to the testing of the updated service code, that each of the first subset of microservices and the second subset of microservice have passed the testing; and
providing, by the continuous integration system for display on a developer system, an indication that each of the first subset of microservices and the second subset of microservice have passed the testing.

16. The method of claim 14, further comprising:
automatically deploying, by the continuous integration system to a service provisioning system in response to determining that each of the first subset of microservices and the second subset of microservices have passed the testing, the updated service code.

17. The method of claim 14, further comprising:
determining, by the continuous integration system in response to the testing of the updated service code, that at least one of the first subset of microservices and the second subset of microservices have not passed the testing; and
providing, by the continuous integration system for display on a developer system, an indication that at least one of the first subset of microservices and the second subset of microservices have not passed the testing.

18. The method of claim 14, wherein the second subset of microservices are dependent on the at least one subset of microservices based on the second subset of microservices utilizing at least one output generated by the at least one subset of microservices during the testing.

19. The method of claim 14, wherein the first subset of microservices includes at least two microservices, and wherein the updating of the at least one first portion of service code that provides the first subset of microservices for the service includes updating the at least two microservices included in the first subset of microservices in parallel.

20. The method of claim 14, further comprising:
receiving, by a build dispatcher system, a microservice modification request;
identifying, by the build dispatcher system, the first subset of microservices that are included in the plurality of microservices that are configured to provide the service, and for which the modification has been requested in the microservice modification request; and
triggering, by the build dispatcher system, for each of the first subset of microservices, the respective microservice pipeline that causes the continuous integration system to receive the respective microservice modified code for each of the first subset of microservices.

* * * * *